(12) United States Patent
Knigge et al.

(10) Patent No.: US 8,320,069 B1
(45) Date of Patent: Nov. 27, 2012

(54) DISK DRIVE DETECTING POSITIVE CORRELATION IN FLY HEIGHT MEASUREMENTS

(75) Inventors: Bernhard E. Knigge, San Jose, CA (US); James P. R. McFadyen, Redwood City, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/727,154

(22) Filed: Mar. 18, 2010

(51) Int. Cl.
*G11B 21/02* (2006.01)
*G11B 27/36* (2006.01)

(52) U.S. Cl. ............................................ 360/75; 360/31

(58) Field of Classification Search .................. None
See application file for complete search history.

(56) References Cited

U.S. PATENT DOCUMENTS

| | | | |
|---|---|---|---|
| 4,775,902 A | 10/1988 | Trovato et al. |
| 4,777,544 A | 10/1988 | Brown et al. |
| 4,804,894 A | 2/1989 | Machida et al. |
| 4,839,754 A | 6/1989 | Gami et al. |
| 5,130,866 A | 7/1992 | Klaassen et al. |
| 5,168,413 A | 12/1992 | Coker et al. |
| 5,377,058 A | 12/1994 | Good et al. |
| 5,594,595 A | 1/1997 | Zhu |
| 5,742,446 A | 4/1998 | Tian et al. |
| 5,909,330 A | 6/1999 | Carlson et al. |
| 5,949,605 A | 9/1999 | Lee et al. |
| 6,008,640 A | 12/1999 | Tan et al. |
| 6,052,243 A | 4/2000 | Shimada |
| 6,097,559 A | 8/2000 | Ottesen et al. |
| 6,104,687 A | 8/2000 | Lee et al. |
| 6,125,008 A | 9/2000 | Berg et al. |
| 6,175,456 B1 | 1/2001 | Yun |
| 6,178,157 B1 | 1/2001 | Berg et al. |
| 6,191,901 B1 | 2/2001 | Carlson et al. |
| 6,268,976 B1 | 7/2001 | Carlson et al. |
| 6,288,856 B1 | 9/2001 | Ottesen et al. |
| 6,310,740 B1 | 10/2001 | Dunbar et al. |
| 6,417,981 B1 | 7/2002 | Smith |
| 6,452,735 B1 | 9/2002 | Egan et al. |
| 6,459,539 B1 | 10/2002 | Carlson et al. |
| 6,493,169 B1 | 12/2002 | Ferris et al. |
| 6,501,606 B2 | 12/2002 | Boutaghou et al. |
| 6,519,102 B1 | 2/2003 | Smith et al. |
| 6,608,727 B2 | 8/2003 | Ottesen et al. |
| 6,611,389 B1 | 8/2003 | Liu et al. |
| 6,624,957 B1 | 9/2003 | Yun |
| 6,671,110 B2 | 12/2003 | Baba et al. |
| 6,671,111 B2 | 12/2003 | Ottesen et al. |
| 6,674,590 B2 | 1/2004 | Ottesen et al. |
| 6,678,108 B2 | 1/2004 | Smith et al. |
| 6,700,724 B2 | 3/2004 | Riddering et al. |

(Continued)

OTHER PUBLICATIONS

Shiramatsu et al., "Dynamically Controlled Thermal Flying-Height Control Slider", IEEE Transactions on Magnetics, vol. 44, Issue 11, Nov. 2008, pp. 3695-3697.

*Primary Examiner* — K. Wong (57) ABSTRACT

A disk drive is disclosed comprising a plurality of disks having a plurality of disk surfaces. The disk drive further comprises a head actuated over each disk surface, and a spindle motor for rotating the disks. A first fly height measurement is generated for a first disk surface, and a second fly height measurement is generated for a second disk surface. A positive correlation is detected in the first and second fly height measurements.

23 Claims, 8 Drawing Sheets

U.S. PATENT DOCUMENTS

| | | |
|---|---|---|
| 6,717,764 B2 | 4/2004 | Lake |
| 6,735,027 B2 | 5/2004 | Helsel et al. |
| 6,762,899 B2 | 7/2004 | Ottesen et al. |
| 6,765,745 B2 | 7/2004 | Smith et al. |
| 6,785,081 B2 | 8/2004 | Chapin et al. |
| 6,798,605 B2 | 9/2004 | Kurita et al. |
| 6,801,376 B2 | 10/2004 | Smith |
| 6,822,816 B2 | 11/2004 | Dakroub |
| 6,865,040 B2 | 3/2005 | Fayeulle et al. |
| 6,883,368 B2 | 4/2005 | Smith et al. |
| 6,888,694 B2 * | 5/2005 | Guo et al. .................. 360/77.03 |
| 6,894,854 B1 | 5/2005 | Carlson et al. |
| 6,930,844 B2 | 8/2005 | Yeh et al. |
| 6,950,266 B1 | 9/2005 | McCaslin et al. |
| 6,968,731 B2 | 11/2005 | Hu et al. |
| 6,980,383 B2 | 12/2005 | Brunnett et al. |
| 6,992,853 B2 | 1/2006 | Chang |
| 7,016,131 B2 | 3/2006 | Liu et al. |
| 7,023,647 B2 | 4/2006 | Bloodworth et al. |
| 7,038,875 B2 | 5/2006 | Lou et al. |
| 7,046,463 B2 | 5/2006 | Gay Sam et al. |
| 7,068,449 B2 | 6/2006 | Riddering et al. |
| 7,068,451 B1 | 6/2006 | Wang et al. |
| 7,068,457 B2 | 6/2006 | Riddering et al. |
| 7,092,195 B1 | 8/2006 | Liu et al. |
| 7,095,578 B2 | 8/2006 | Ma |
| 7,158,325 B1 | 1/2007 | Hu et al. |
| 7,180,692 B1 | 2/2007 | Che et al. |
| 7,215,500 B1 | 5/2007 | Albrecht et al. |
| 7,253,984 B1 | 8/2007 | Patapoutian et al. |
| 7,265,933 B1 | 9/2007 | Phan et al. |
| 7,271,975 B2 | 9/2007 | Shimizu et al. |
| 7,324,299 B1 | 1/2008 | Schreck et al. |
| 7,349,170 B1 | 3/2008 | Rudman et al. |
| 7,359,138 B1 | 4/2008 | Albrecht et al. |
| 7,369,340 B1 | 5/2008 | Dang et al. |
| 7,375,914 B1 | 5/2008 | Dieron et al. |
| 7,376,182 B2 | 5/2008 | Kris |
| 7,426,090 B2 | 9/2008 | Yamashita et al. |
| 7,450,333 B2 | 11/2008 | Hirano et al. |
| 7,457,072 B2 | 11/2008 | Dieron et al. |
| 7,508,617 B1 | 3/2009 | Mak et al. |
| 7,583,466 B2 | 9/2009 | Kermiche et al. |
| 7,605,997 B2 | 10/2009 | Yamazaki |
| 7,630,162 B2 * | 12/2009 | Zhao et al. ...................... 360/75 |
| 7,675,707 B1 | 3/2010 | Liu et al. |
| 7,729,080 B2 | 6/2010 | Suzuki |
| 7,839,595 B1 | 11/2010 | Chue et al. |
| 7,916,420 B1 | 3/2011 | McFadyen et al. |
| 8,059,357 B1 | 11/2011 | Knigge et al. |
| 2002/0167745 A1 | 11/2002 | Ottesen et al. |
| 2003/0002183 A1 | 1/2003 | Fioravanti |
| 2003/0043491 A1 | 3/2003 | Riddering et al. |
| 2003/0133220 A1 | 7/2003 | Hsin |
| 2003/0184899 A1 | 10/2003 | Gay Sam et al. |
| 2003/0184907 A1 | 10/2003 | Li et al. |
| 2003/0218813 A1 | 11/2003 | Dakroub |
| 2004/0075940 A1 | 4/2004 | Bajorek et al. |
| 2005/0128630 A1 | 6/2005 | Huang et al. |
| 2006/0158769 A1 | 7/2006 | Ono et al. |
| 2006/0268445 A1 | 11/2006 | Brannon et al. |
| 2007/0127148 A1 | 6/2007 | Yokohata et al. |
| 2007/0211368 A1 | 9/2007 | Shibano et al. |
| 2007/0268615 A1 | 11/2007 | McFadyen et al. |
| 2008/0088962 A1 | 4/2008 | Baral |
| 2008/0130159 A1 | 6/2008 | Dieron et al. |
| 2008/0158730 A1 | 7/2008 | Furukawa et al. |
| 2008/0165446 A1 | 7/2008 | Partee |
| 2008/0239547 A1 | 10/2008 | Okamura |
| 2009/0002860 A1 | 1/2009 | Takamatsu et al. |
| 2009/0141390 A1 | 6/2009 | Oyamada et al. |
| 2009/0195912 A1 | 8/2009 | Sato |
| 2011/0043938 A1 | 2/2011 | Mathew et al. |

* cited by examiner

FIG. 2A $$\frac{\sum_{i=1}^{n}(x_i - \bar{x})(y_i - \bar{y})}{(n-1)S_xS_y}$$

DISK DRIVE DETECTING POSITIVE CORRELATION IN FLY HEIGHT MEASUREMENTS

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

An air bearing forms between the head and the disk due to the disk rotating at high speeds. Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator. It is desirable to determine the appropriate fly height actuator control signal (e.g., appropriate current applied to a heater) that achieves the target fly height for the head.

DETAILED DESCRIPTION OF EMBODIMENTS OF THE INVENTION

Figure 1A:
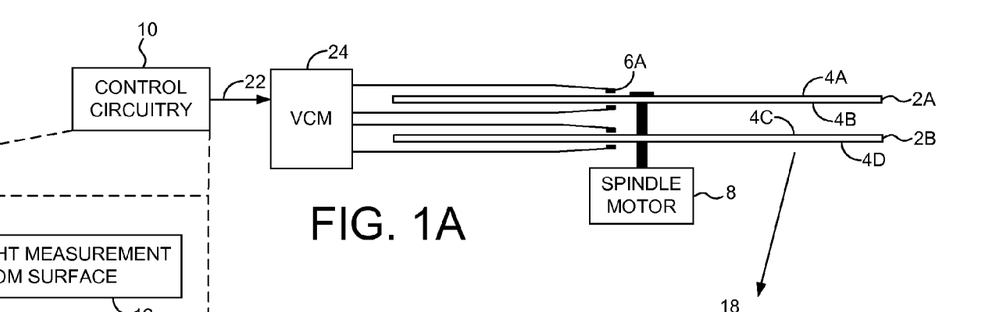
FIG. 1A shows a disk drive according to an embodiment of the present invention comprising a plurality of disks having a plurality of disk surfaces.

FIG. 1A shows a disk drive according to an embodiment of the present invention comprising a plurality of disks 2A-2B having a plurality of disk surfaces 4A-4D. A head (e.g., head 6A) is actuated over each disk surface (e.g., disk surface 4A), and a spindle motor 8 rotates the disks 2A-2B. The disk drive further comprises control circuitry 10 for executing the flow diagram of FIG. 1C wherein a first fly height measurement is generated for a first disk surface (step 12), and a second fly height measurement is generated for a second disk surface (step 14). A positive correlation is detected in the first and second fly height measurements (step 16).

Figure 1B:
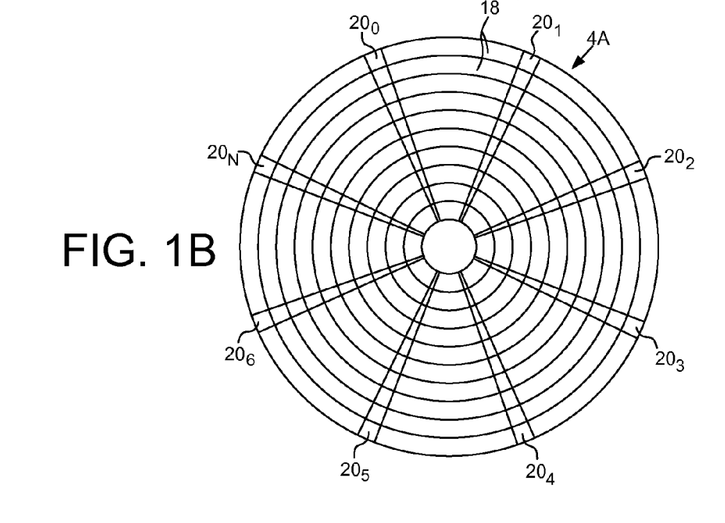
FIG. 1B shows a format of a disk surface comprising data tracks defined by embedded servo sectors according to an embodiment of the present invention.
Figure 1C:
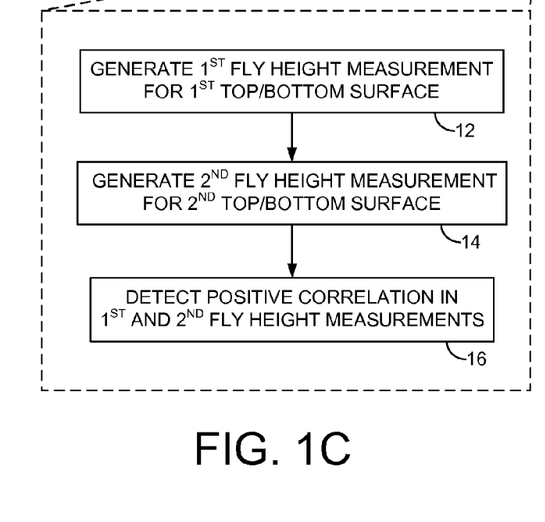
FIG. 1C is a flow diagram according to an embodiment of the present invention wherein a positive correlation is detected in fly height measurements generated for first and second disk surfaces.

FIG. 1B shows a format of a disk surface 4A according to an embodiment of the present invention comprising a plurality of tracks 18 defined by a plurality of servo sectors $20_0$-$20_N$. Each servo sector 20 may comprise suitable positioning information, such as a track addresses for coarse positioning and servo bursts for fine positioning. Each servo sector may also comprise a preamble (e.g., a 2 T preamble) for synchronizing to the servo sector, wherein in one embodiment the preamble and/or the servo bursts may also be used to generate the fly height measurement. When the head 6A passes over a servo sector 20, the position information is demodulated by the control circuitry 10 into a control signal 22 applied to a voice coil motor 24. The voice coil motor 24 rotates an actuator arm about a pivot in order to position the head 6A radially over the disk surface 4A.

Figure 2A:
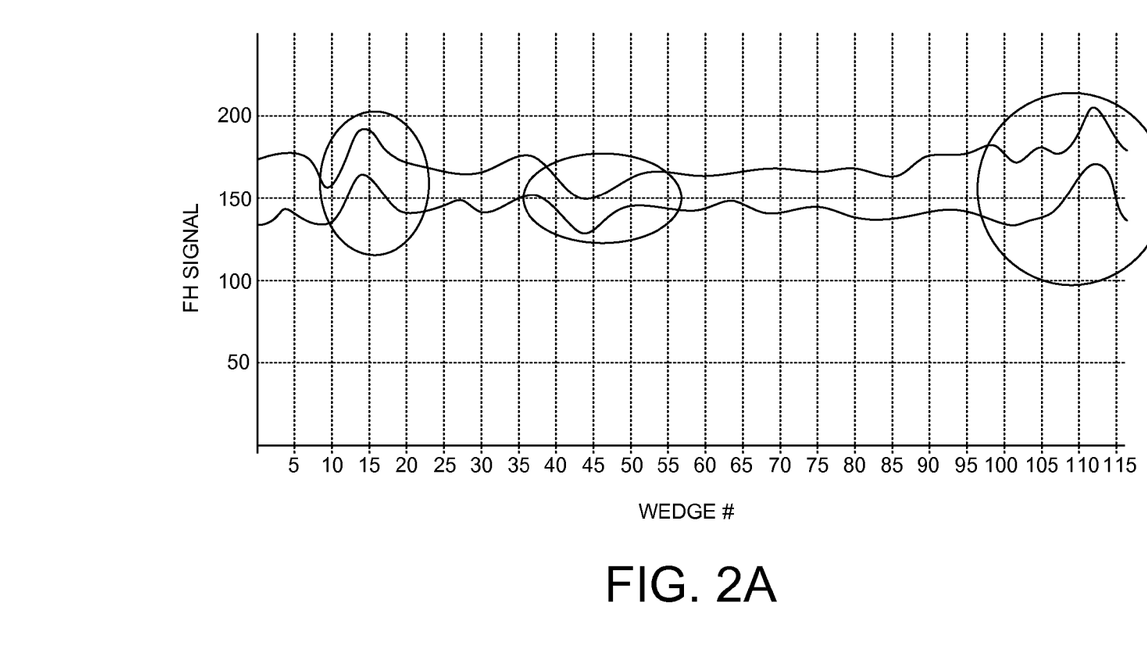
FIG. 2A shows a positive correlation in the fly height measurements for first and second disk surfaces according to an embodiment of the present invention.
Figure 2B:
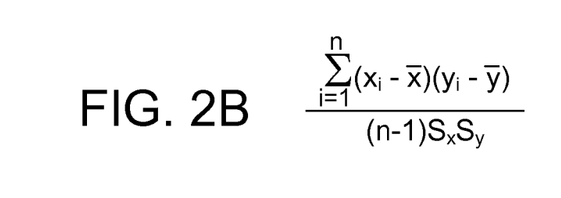
FIG. 2B shows an equation for measuring the positive correlation according to an embodiment of the present invention.

FIG. 2A shows example fly height measurements generated for a first disk surface and a second disk surface, wherein both surfaces are either top or bottom surfaces. Since the disks 2A-2B are clamped to and rotated by the spindle motor 8, vertical vibrations in the spindle motor 8 (e.g., due to cogging and/or axial runout) will cause a positive correlation in the fly height measurements for the top surfaces as well as the bottom surfaces of the disks. FIG. 2A illustrates a positive correlation in the fly height measurements over a revolution of the disks due to vertical vibration caused by the spindle motor 8. Any suitable technique may be used to detect the positive correlation, wherein FIG. 2B shows a conventional algorithm for computing a positive correlation between two signals, where $\bar{x}$ and $\bar{y}$ are the sample means of the signals x and y, and Sx and Sy are the sample standard deviations of signals x and y. Any suitable length of sample window (number of samples n) may be selected to compute the correlation using the equation of FIG. 2B. The output of the computed correlation will range from −1 to +1, where −1 indicates a highly negative correlation and +1 indicates a highly positive correlation.

Figure 3A:
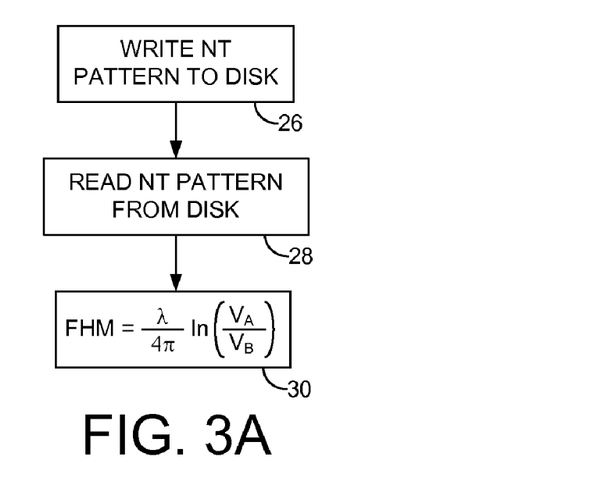
FIG. 3A shows a harmonic ratio (HR) method for generating a fly height measurement according to an embodiment of the present invention.

Any suitable technique may be employed to generate the fly height measurements for each disk surface. FIG. 3A shows an embodiment of the present invention wherein the fly height measurement is generated using a harmonic ratio (HR) method. An NT pattern (e.g., 2 T pattern) is written to the disk (step 26), and then read from the disk (step 28). A fly height measurement (FHM) is generated (step 30) by measuring an amplitude of the read signal at a first harmonic ($V_A$) and at a second harmonic ($V_B$). A log of the ratio ($V_A/V_B$) is then multiplied by ($\lambda/4\pi$), where $\lambda$ is the frequency of the NT read signal in the spatial domain (i.e., velocity/write_frequency). In one embodiment, the first harmonic is the fundamental harmonic of the NT read signal, and the second harmonic is the third harmonic of the NT read signal. The NT pattern may be written in the user data area between the servo sectors (FIG. 1B) and the HR fly height measurement generated at any suitable resolution (e.g., once per data sector). In another embodiment, the preamble and/or the servo bursts within the servo sectors and/or the preamble of a data sector may be read to generate the NT read signal for performing the HR fly height measurement. In either case, the control circuitry may align a first head over a first track of a first disk surface to perform the first fly height measurement, and then align a second head over a corresponding second track of a second disk surface to perform the second fly height measurement.

In one embodiment, the amplitude of the second harmonic may be generated by writing and reading a higher frequency NT pattern and extracting the fundamental frequency from the NT read signal. For example, the amplitude of the first harmonic may be generated by writing and reading a 6 T pattern and extracting the fundamental frequency from the 6 T read signal, and the second harmonic may be generated by writing and reading a 2 T pattern and extracting the fundamental frequency from the 2 T read signal.

Figure 3B:
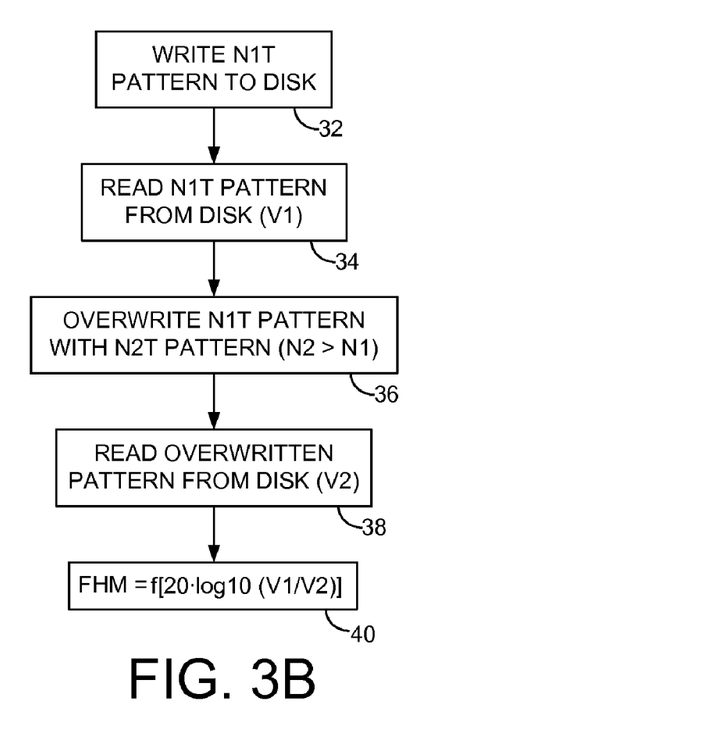
FIG. 3B shows an overwrite method for generating a fly height measurement according to an embodiment of the present invention.

FIG. 3B is a flow diagram according to an embodiment of the present invention for generating the fly height measurement for each disk surface using an overwrite (OW) method. A first N1T pattern (e.g., 2T pattern) is written to the disk (step 32) and an amplitude V1 of the read signal measured while reading the pattern (step 34). A second N2T pattern (e.g., 13 T pattern) is written over the N1T pattern (step 36) wherein N2T is greater than N1T. An amplitude V2 of the read signal (at frequency 1/N1T) is measured when reading the overwritten pattern from the disk (step 38). The fly height measurement is then generated (step 40) as a function of twenty times the log 10(V1/V2). The equation of FIG. 3B generates units of decibels rather than units of length and therefore in one embodiment the decibel units may be transformed into units of length using any suitable function. In other embodiments, the decibel units may be used directly, for example, to qualify/screen the spindle motor and/or to generate feed-forward compensation values described below.

The OW fly height method of FIG. 3B may provide a suitable fly height measurement for disk drives employing perpendicular recording (wherein the magnetic write field is perpendicular to the disk surface). In another embodiment, a reverse OW fly height method may be employed for disk drives employing longitudinal magnetic recording (where the magnetic write current is in-plane with the disk surface). In the reverse OW fly height method, the frequency of the first N1T pattern is less than the frequency of the second N2T pattern (i.e., N2<N1).

Factors other than actual fly height may distort the fly height measurement of a single disk surface. For example, when generating the fly height measurement by reading a pattern from the disk (e.g., using the above HR or OW methods), the read signal may be corrupted by imperfections on the disk as well as other noise inherent in the write/read process. In one embodiment, the noise in the fly height measurement is attenuated by correlating the fly height measurements for at least two disk surfaces from at least two disks (e.g., two top surfaces or two bottom surfaces). A positive correlation in the fly height measurements from the two disk surfaces indicates a true fly height deviation due to vertical vibration of both disks. The positive correlation may be used in any suitable manner, such as for evaluating the quality of a particular spindle motor targeted for a family of disk drives, or to certify the spindle motor in each disk drive during production. For example, if there is a high degree and frequency of correlation, together with extreme fly height measurements (high or low), the spindle motor may be considered unacceptable in general for a family of disk drives, or considered defective and therefore replaced within an individual disk drive. In other embodiments described below, the positive correlation may be used to generate feed-forward compensation values to control the fly height of the head (open-loop or closed-loop) so as to follow the deviations in fly height caused by the vertical vibration of the disks.

Figure 4A:
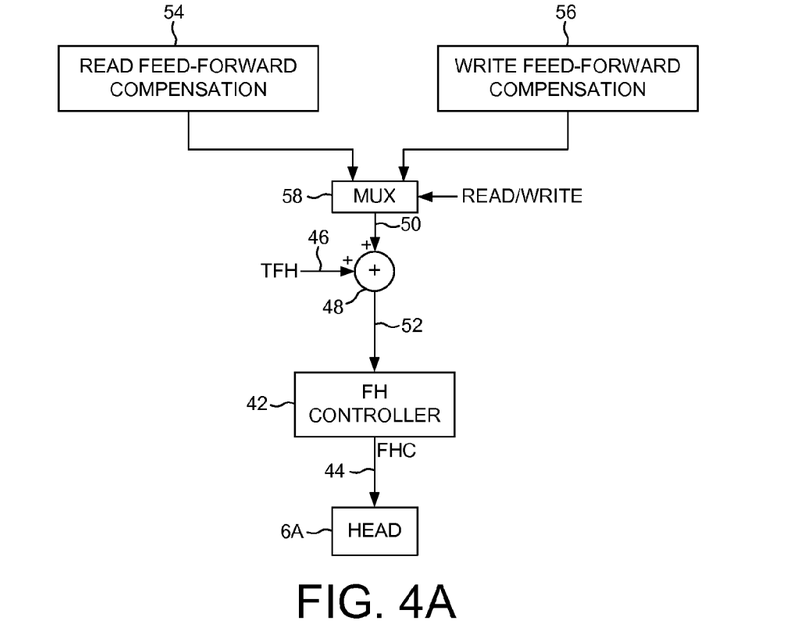
FIG. 4A shows an embodiment of the present invention wherein feed-forward compensation values computed in response to the positive correlation are used to control a fly height of a head open loop according to an embodiment of the present invention.

FIG. 4A shows control circuitry according to an embodiment of the present invention including a fly height controller 42 for generating an analog fly height control (FHC) signal 44 applied to a suitable actuator (e.g., a heating element or piezo-electric actuator) integrated with the head 6A. A target fly height (TFH) 46 is established (e.g., using a suitable touch-down calibration algorithm) which represents a target "DC" fly height for the head 6A. An adder 48 adds a feed-forward compensation value 50 to the TFH 46 to generate a digital fly height control signal 52 applied to the fly height controller 42, wherein the feed-forward compensation values 50 represent an "AC" fly height for the head 6A. In one embodiment, the feed-forward compensation values 50 are generated in response to the positive correlation in the fly height measurement for top and/or bottom disk surfaces as described above. In this manner, the fly height of the head 6A is controlled so as to follow the fly height deviations caused by the vertical vibrations of the disk.

In the embodiment of FIG. 4A, read feed-forward compensation values 54 may be generated for read operations, and write feed-forward compensation values 56 may be generated for write operations. A multiplexer 58 selects the appropriate feed-forward compensation value depending on whether the control circuitry is executing a read or write operation. In one embodiment, feed-forward compensation values may also be generated for other modes, such as during idle or when seeking the head 6A to a target track. The difference between read and write feed-forward compensation values may be determined in any suitable manner. In one embodiment, the read feed-forward compensation values 54 are generated using the HR fly height measurement disclosed above in FIG. 3A which may be more sensitive to the fly height of the read element in the head 6A. The write feed-forward compensation values 56 may be generated using the OW fly height measurement disclosed above in FIG. 3B which may be more sensitive to the fly height of the write element in the head 6A.

The feed-forward compensation values may be generated at any suitable resolution, such as once per servo sector $20_0$-$20_N$ (FIG. 1A). In addition, the feed-forward compensation values may be generated in any suitable manner in response to the detected positive correlation values (PCV). For example, in one embodiment the PCV are used to bias the fly height measurements for each disk surface which effectively attenuates noise not indicative of actual fly height. For example, each fly height measurement for each disk surface may be scaled by (1+PCV) or $(1+PCV)^2$ or any other suitable scalar derived from the PCV. The resulting feed-forward compensation values may then be scaled appropriately to correlate with the desired change in fly height using any suitable technique. In one embodiment, other feed-forward compensation values may be generated, for example, based on negative correlation values (NCV) in fly height measurements from the top and bottom surface of the same disk which indicates a fly height deviation due to a warping of the disk. Each fly height measurement for each disk surface may be scaled by abs[(−1+NCV)] or (−1+NCV)$^2$ or any other suitable scalar derived from the NCV (where NCV may be generated from the negative values computed using FIG. 2B). All of the feed-forward compensation values may then be combined using a suitable algorithm to generate a final set of feed-forward compensation values.

Figure 4B:
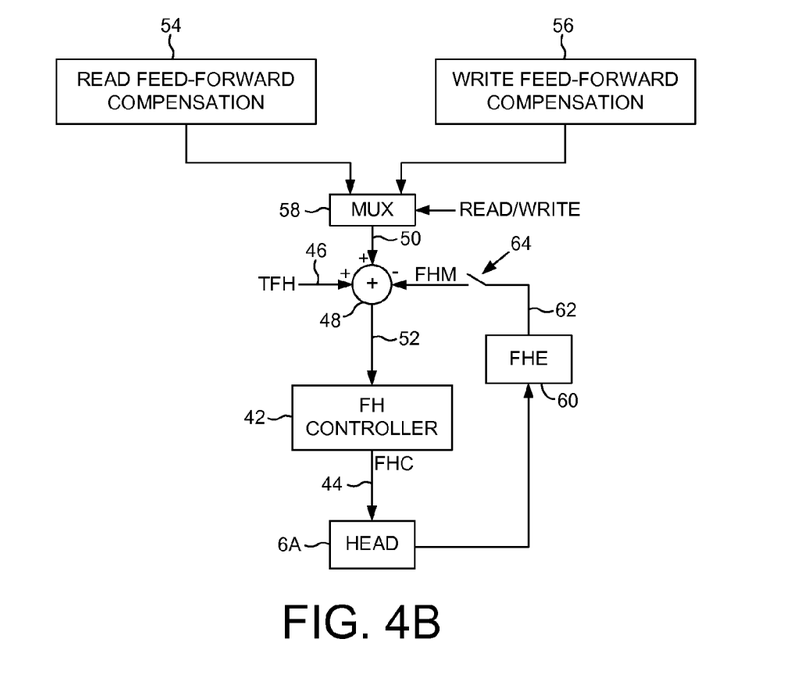
FIG. 4B shows an embodiment of the present invention wherein feed-forward compensation values computed in response to the positive correlation are used to control a fly height of a head closed loop according to an embodiment of the present invention.

In the embodiment of FIG. 4A the feed-forward compensation values 50 are applied using "open loop" control. In an alternative embodiment shown in FIG. 4B, the feed-forward compensation values 50 may be applied using "closed loop" control where a fly height estimator (FHE) 60 generates a fly height measurement (FHM) 62 that is subtracted from the target fly height (TFH) 46 and the feed-forward compensation value 50 to generate the digital fly height control signal 52. The FHE 60 may measure the fly height using any suitable technique, such as the HR fly height measurement of FIG. 3A, the OW fly height measurement of FIG. 3B, by measuring the capacitance between the head and the disk surface, etc. If a loop compensation filter is employed, the difference between TFH and FHM (the fly height error) may be filtered before adding the feed-forward compensation value 50. A switch 64 may disable the feedback when learning the positive correlation between the fly height measurements in order to generate the feed-forward compensation values 50.

In one embodiment the initial feed-forward compensation values may be adjusted based on the feedback (FHM). That is, the feed-forward compensation values may be adjusted so as to minimize the fly height error (difference between TFH and FHM). This embodiment is illustrated in the flow diagram of FIG. 5 wherein the fly height of the head is initialized to a target fly height (step 66). Data is read from a first (top/bottom) disk surface to generate a first fly height measurement (step 68), and data is read from a second (top/bottom) disk surface to generate a second fly height measurement (step 70). A positive correlation in the first and second fly height measurements is detected (step 72) and initial feed-forward compensation values are generated for each head in response to the positive correlation (step 74). The feed-forward compensation values are used to control the fly height of a head (step 76) and the resulting fly height is measured (step 78). The feed-forward compensation values are adjusted (step 80) in response to the measured fly height (e.g., in a direction that reduces the error between the TFH and the FHM). This process may be repeated for the same head (step 82) for a number of iterations, or until a desired level of performance is achieved. The process is then repeated for each head in order to adjust the feed-forward compensation values for each head. In one embodiment, the feed-forward compensation values may be adjusted during a calibration period wherein a data pattern is written to and read from the disk. In another embodiment, the feed-forward compensation values may be adjusted during normal operation of the drive (e.g., a fly height measurement may be taken when reading the preamble of a data sector or a servo sector or when reading servo bursts in a servo sector).

Figure 5:
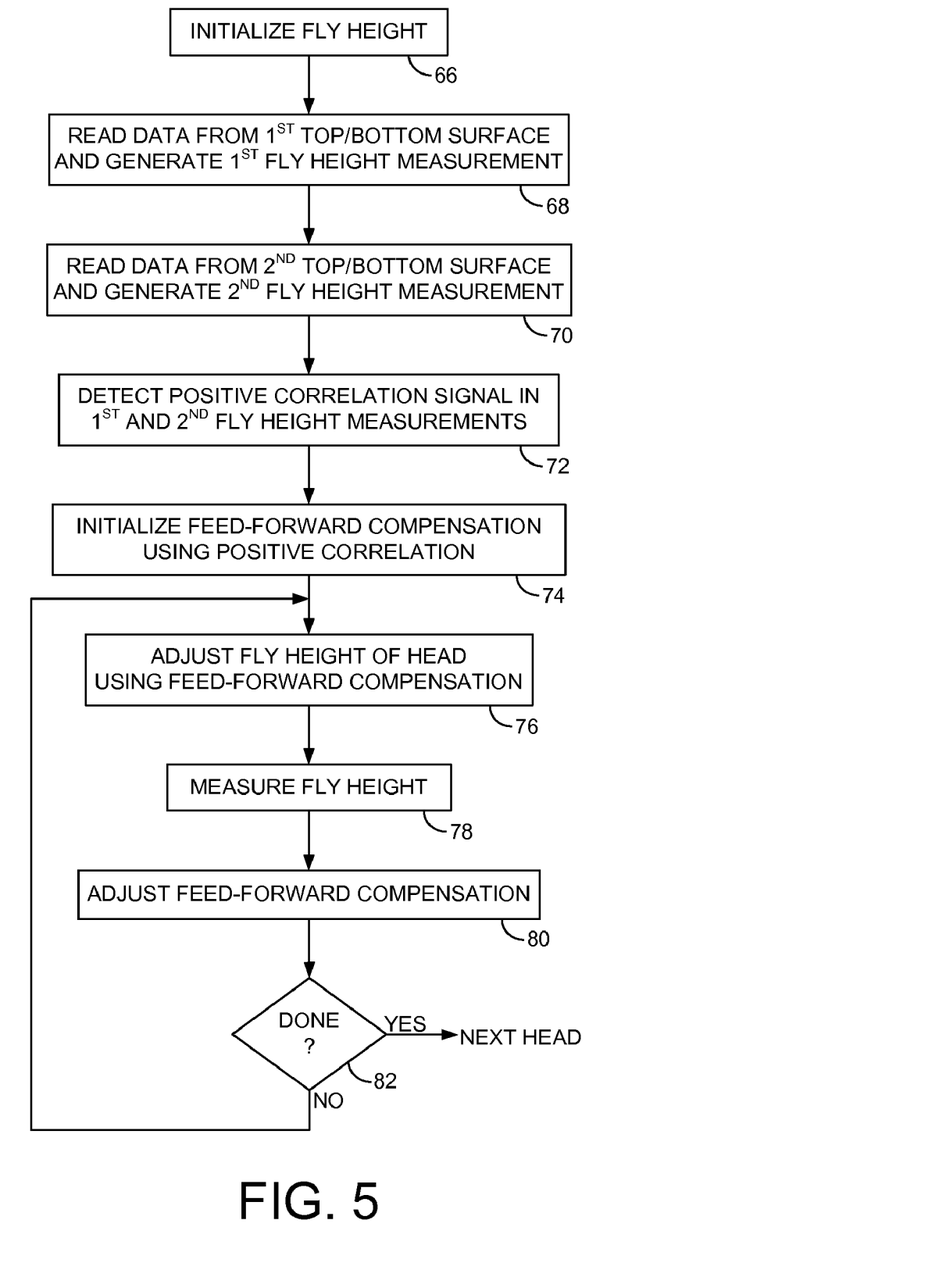
FIG. 5 is a flow diagram according to an embodiment of the present invention wherein the initial feed-forward compensation values generated from the positive correlation are adjusted closed loop according to an embodiment of the present invention.

The feed-forward compensation values may be adjusted at step 80 of FIG. 5 in any suitable manner. In one embodiment, the amplitude of each feed-forward compensation value may be adjusted (e.g., increased or decreased) based on the fly height measurement. In another embodiment, the initial feed-forward compensation values may be generated at a particular frequency or frequencies of interest (e.g., at a harmonic of the spindle motor). For example, the initial feed-forward compensation values may be processed in order to extract a sinusoid at frequencies of interest (e.g., the fundamental and harmonics of the spindle motor). Coefficients of the sinusoid(s) may then be adjusted in order to adjust both the amplitude and phase of the frequency component in a manner that reduces the difference between the TFH and the FHM.

Figure 6A:
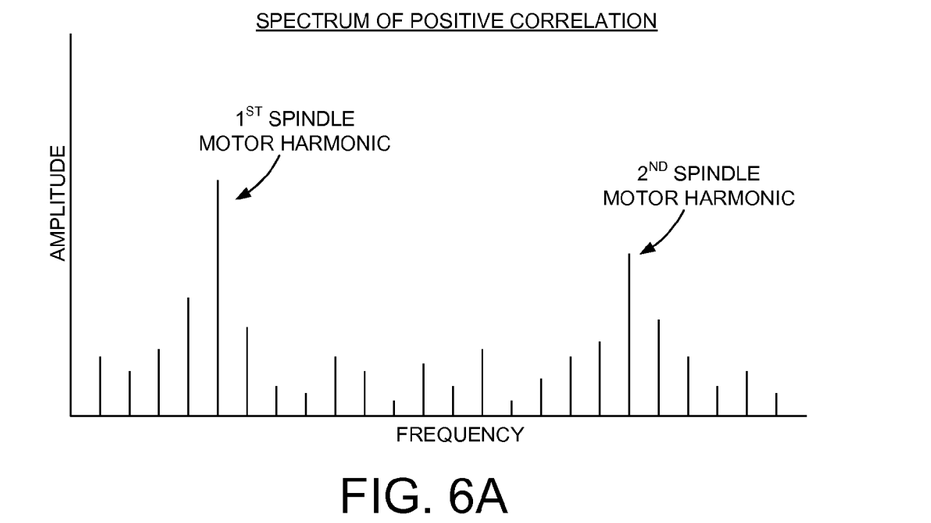
FIG. 6A shows a spectrum of the positive correlation according to an embodiment of the present invention.

In one embodiment, the positive correlation may be processed in order to extract a sinusoid at frequencies of interest, and then the extracted sinusoid(s) used to generate the initial feed-forward compensation values. This embodiment is illustrated in FIG. 6A which shows a spectrum of the positive correlation having high amplitude at the fundamental frequency and $2^{nd}$ harmonic of the spindle motor. The component at these frequencies can be extracted using any suitable technique, such as by filtering the positive correlation with suitable band-pass filters, or computing a discrete-time Fourier transform of the positive correlation.

Figure 6B:
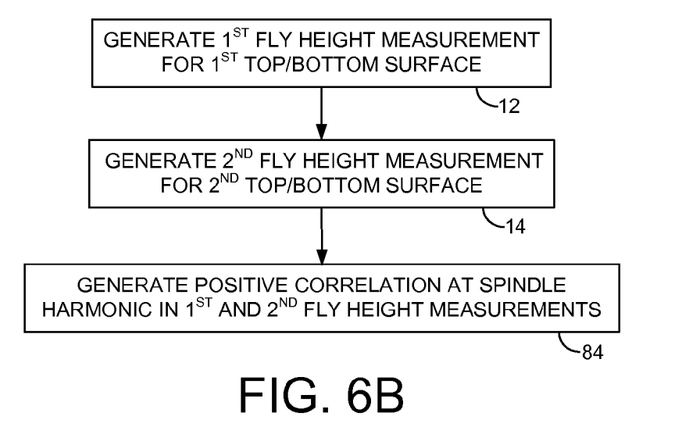
FIG. 6B is a flow diagram according to an embodiment of the present invention wherein the positive correlation is generated at a harmonic of the spindle motor.

FIG. 6B shows a flow diagram of this embodiment wherein after generating the first fly height measurement (step 12) and the second fly height measurement (step 14), the positive correlation in the first and second measurements is detected at one or more harmonics of the spindle motor (step 84). The resulting positive correlation at the spindle harmonic(s) may be used to qualify/screen the spindle motor and/or to generate feed-forward compensation values as described above. This embodiment may improve either application since the vertical vibration of the disks typically occurs at harmonics of the spindle motor. That is, focusing on the harmonics of the spindle motor may essentially filter out noise in the correlation measurement not due to actual fly height deviations.

The fly height measurement for each head may be generated using any suitable technique instead of, or in addition to, the HR fly height measurement and the OW fly height measurement described above. For example, a capacitance between the head and the disk surface may be measured and correlated with fly height. In one embodiment, multiple fly height measurements may be generated using different techniques, and the results averaged to get a more accurate measurement. In another embodiment, the fly height may be measured at multiple tracks on each disk surface (e.g., for a band of tracks) and the results averaged to improve the accuracy of the fly height measurement. In yet another embodiment, the fly height measurement may be generated at multiple radial locations across each disk surface (e.g., at multiple zones). The resulting measurements may be used to qualify the spindle motor and/or to generate feed-forward compensation values for each zone.

In one embodiment, an amplitude of the read signal may be evaluated to generate the fly height measurement. For example, the above described HR fly height measurement and OW fly height measurement involve measuring an amplitude of the read signal at specific frequencies (e.g., 2 T or 6 T frequencies). In another embodiment, the amplitude of the read signal may be input into a Wallace spacing equation to measure the fly height. The amplitude of the read signal may be measured directly by evaluating the read signal in the analog or discrete-time domain before the read signal has been amplified to match a target amplified read signal amplitude, or the amplitude may be measured indirectly by monitoring a read signal value that is indicative of the read signal amplitude. For example, in one embodiment the disk drive comprises a variable gain amplifier (VGA) for amplifying the read signal, and a VGA value, such as the VGA gain setting or the gain error used to generate the VGA gain setting may be evaluated to measure the amplitude of the read signal.

Figure 7A:
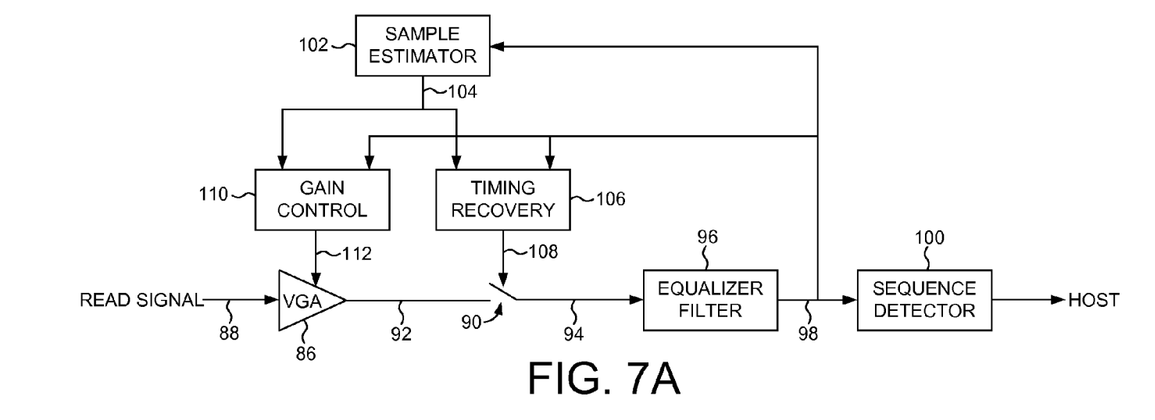
FIG. 7A shows read channel circuitry according to an embodiment of the present invention.

This embodiment is illustrated in FIG. 7A which shows read channel components according to an embodiment of the present invention, including a VGA 86 for amplifying a read signal 88 emanating from a head. The read channel further comprises a sampling device 90 for sampling the amplified read signal 92 to generate a sequence of read signal sample values 94. An equalizing filter 96 shapes the read signal sample values 94 according to a desired response (e.g., a partial response or PR) to generate equalized sample values 98. The equalized sample values 98 are processed by a sequence detector 100 (e.g., a Viterbi detector) to detect an estimated bit sequence representing the data recorded on the disk. The read channel further comprises a sample estimator 102 (e.g., a slicer) for estimating a target sample value 104 from an equalized sample value 98. The target sample value 104 and equalized sample value 98 are processed by timing recovery 106 to synchronize a sampling clock 108 to the baud rate of the data, and processed by gain control 110 to generate a VGA gain setting 112 for adjusting the gain of the VGA 86.

Figure 7B:
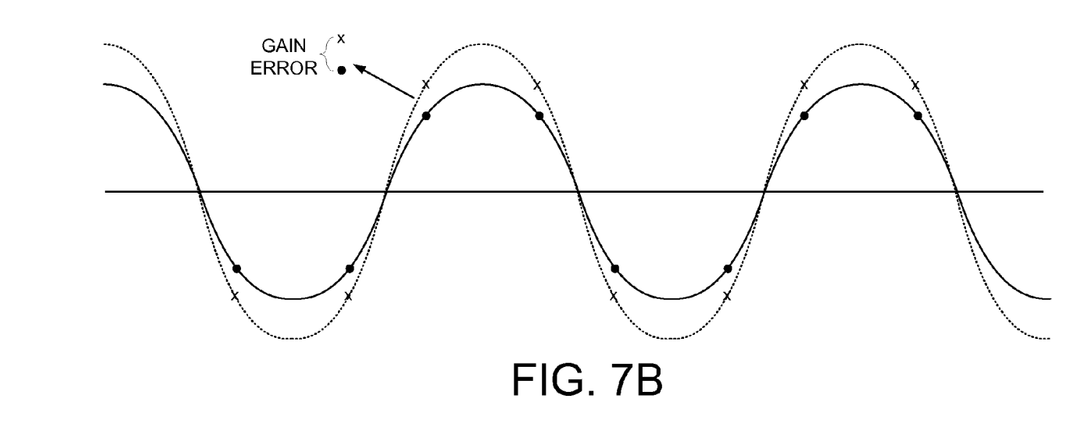
FIG. 7B shows an embodiment of the present invention wherein a fly height measurement is generated from a gain control loop.

Operation of the gain control 110 is understood with reference to FIG. 7B which shows a substantially sinusoidal read signal generated by reading a 2 T pattern. The solid circles represent the measured amplified read signal samples, and the "x"s represent target sample values corresponding to a target amplitude of the amplified read signal. The resulting gain error is used to adjust the gain setting 112 and therefore the gain of the VGA 86. In the example of FIG. 7B, the gain error will increase the gain setting 112 so as to increase the amplitude of the amplified read signal 92 toward the target amplitude. Therefore, the gain error and/or the gain setting 112 may be evaluated to measure the amplitude of the read signal 88 input into the VGA 86, and the resulting amplitude measurement may be transformed into a fly height measurement using any suitable function.

Figure 8A:
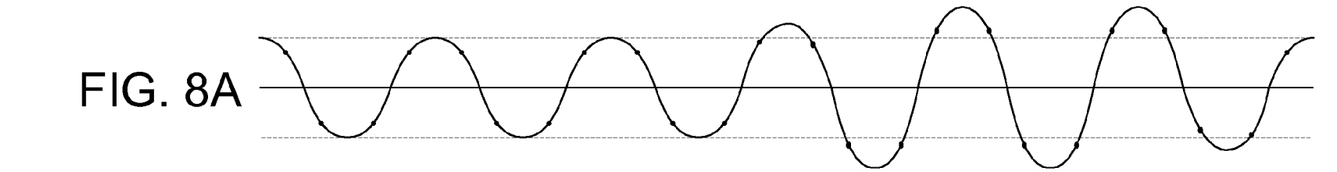
FIGS. 8A-8D show an embodiment of the present invention wherein a positive correlation in first and second fly height measurements is generated by comparing the read signals to slicer thresholds.
Figure 8B:
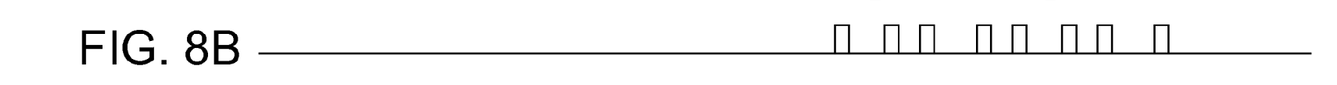
Figure 8C:
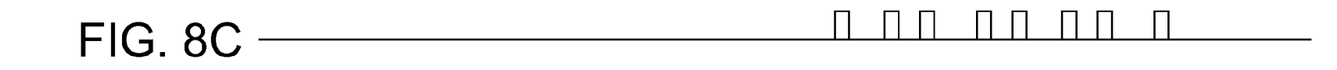
Figure 8D:
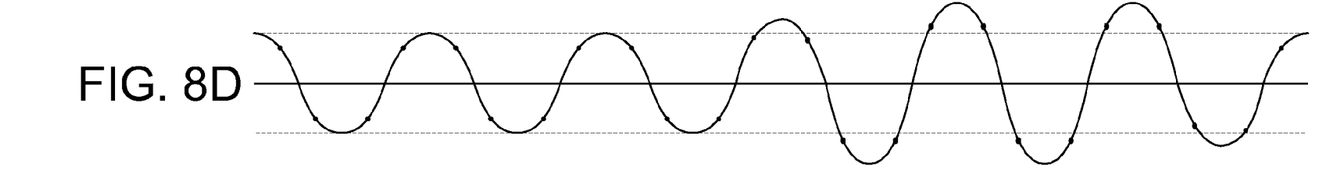

Any suitable technique may also be used to detect the positive correlation in the fly height measurements. FIGS. 8A-8D illustrate an embodiment of the present invention wherein the positive correlation is detected by detecting a bit sequence for each of the first and second read signals. The read signal of FIG. 8A may be generated by reading a 2 T pattern from a first (top/bottom) disk surface and the read signal of FIG. 8D may be generated by reading a 2 T pattern from a second (top/bottom) disk surface. The resulting read signals may then be compared to slicer thresholds wherein a "1" bit is detected when the amplitude of the read signal is greater than the threshold. A similar slicer may be employed to detect when the amplitude of the read signal falls below a threshold. A positive correlation is detected when both read signals exceed their respective slicer thresholds (i.e., a "1" bit is detected when both read signals exceeds the lower threshold or both read signals exceed the upper threshold as illustrated in FIGS. 8B and 8C). In one embodiment, the degree of positive correlation is determined by the number of "1" bits detected for both read signals within a predetermined window. The analog read signal at the input to the VGA may be compared to the slicer thresholds, or the gain control loop may be disabled and the samples of the read signals compared to the slicer thresholds.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a plurality of disks comprising a plurality of disk surfaces;
   a head actuated over each disk surface;
   a spindle motor for rotating the disks; and
   control circuitry operable to:
      generate a first plurality of fly height measurements for a first track of a first disk surface over at least part of a revolution of the first disk surface;
      generate a second plurality of fly height measurements for a second track of a second disk surface over at least part of a revolution of the second disk surface; and
      detect a positive correlation in the first plurality of fly height measurements and the second plurality of fly height measurements.

2. The disk drive as recited in claim 1, wherein the first disk surface comprises a first top disk surface and the second disk surface comprises a second top disk surface.

3. The disk drive as recited in claim 1, wherein the first disk surface comprises a first bottom disk surface and the second disk surface comprises a second bottom disk surface.

4. The disk drive as recited in claim 1, wherein the control circuitry is further operable to:
   generate feed-forward compensation values in response to the positive correlation; and
   control a fly height for a first head in response to the feed-forward compensation values.

5. The disk drive as recited in claim 4, wherein the control circuitry is further operable to generate read feed-forward compensation values used to control the fly height during a read operation.

6. The disk drive as recited in claim 4, wherein the control circuitry is further operable to generate write feed-forward compensation values used to control the fly height during a write operation.

7. The disk drive as recited in claim 4, wherein the control circuitry is further operable to:
   generate a third fly height measurement for the first head while controlling the fly height of the first head in response to the feed-forward compensation values; and
   adjust the feed-forward compensation values in response to the third fly height measurement.

8. The disk drive as recited in claim 1, wherein the spindle motor causes vertical vibration of the disks reflected in the positive correlation.

9. The disk drive as recited in claim 8, wherein the control circuitry is further operable to generate the positive correlation at a harmonic of the spindle motor.

10. The disk drive as recited in claim 9, wherein the control circuitry is further operable to filter the positive correlation at a harmonic of the spindle motor.

11. A method of operating a disk drive comprising, the disk drive comprising a plurality of disks comprising a plurality of disk surfaces, a head actuated over each disk surface, and a spindle motor for rotating the disks, the method comprising:
   generating a first plurality of fly height measurements for a first track of a first disk surface over at least part of a revolution of the first disk surface;
   generating a second plurality of fly height measurements for a second track of a second disk surface over at least part of a revolution of the second disk surface; and
   detecting a positive correlation in the first plurality of fly height measurements and the second plurality of fly height measurements.

12. The method as recited in claim 11, wherein the first disk surface comprises a first top disk surface and the second disk surface comprises a second top disk surface.

13. The method as recited in claim 11, wherein the first disk surface comprises a first bottom disk surface and the second disk surface comprises a second bottom disk surface.

14. The method as recited in claim 11, further comprising:
   generating feed-forward compensation values in response to the positive correlation; and
   controlling a fly height for a first head in response to the feed-forward compensation values.

15. The method as recited in claim 14, further comprising generating a read feed-forward compensation values used to control the fly height during a read operation.

16. The method as recited in claim 14, further comprising generating a write feed-forward compensation values used to control the fly height during a write operation.

17. The method as recited in claim 14, further comprising:
   generating a third fly height measurement for the first head while controlling the fly height of the first head in response to the feed-forward compensation values; and
   adjusting the feed-forward compensation values in response to the third fly height measurement.

18. The method as recited in claim 11, wherein the spindle motor causes vertical vibration of the disks reflected in the positive correlation.

19. The method as recited in claim 18, further comprising generating the positive correlation at a harmonic of the spindle motor.

20. The method as recited in claim 19, further comprising filtering the positive correlation at a harmonic of the spindle motor.

21. A disk drive comprising:
   a plurality of disks comprising a plurality of disk surfaces;
   a head actuated over each disk surface;
   a spindle motor for rotating the disks; and
   control circuitry operable to:
      generate a first fly height measurement for a first disk surface;
      generate a second fly height measurement for a second disk surface;
      detect a correlation in the first and second fly height measurements;
      generate feed-forward compensation values in response to the correlation; and
      control a fly height of a first head over the first disk surface in response to the feed-forward compensation values.

22. A disk drive comprising:
   a plurality of disks comprising a plurality of disk surfaces;
   a head actuated over each disk surface;
   a spindle motor for rotating the disks; and
   control circuitry operable to:
      generate a first plurality of fly height measurements for a first track of a first disk surface over at least part of a revolution of the first disk surface;
      generate a second plurality of fly height measurements for a second track of a second disk surface over at least part of a revolution of the second disk surface; and
      detect a positive correlation in the first plurality of fly height measurements and the second plurality of fly height measurements,
      wherein the spindle motor causes vertical vibration of the disks reflected in the positive correlation.

23. A method of operating a disk drive comprising, the disk drive comprising a plurality of disks comprising a plurality of disk surfaces, a head actuated over each disk surface, and a spindle motor for rotating the disks, the method comprising:
   generating a first plurality of fly height measurements for a first track of a first disk surface over at least part of a revolution of the first disk surface;
   generating a second plurality of fly height measurements for a second track of a second disk surface over at least part of a revolution of the second disk surface; and
   detecting a positive correlation in the first plurality of fly height measurements and the second plurality of fly height measurements,
   wherein the spindle motor causes vertical vibration of the disks reflected in the positive correlation.

* * * * *